US008312003B2

(12) United States Patent
Patt-Shamir et al.

(10) Patent No.: US 8,312,003 B2
(45) Date of Patent: Nov. 13, 2012

(54) COMPUTER METHOD AND APPARATUS FOR COLLABORATIVE WEB SEARCHES

(75) Inventors: Boaz Patt-Shamir, Tel Aviv (IL); Mark Rogers Tuttle, Arlington, MA (US); Eytan Adar, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1613 days.

(21) Appl. No.: 11/014,600

(22) Filed: Dec. 16, 2004

(65) Prior Publication Data

US 2006/0136377 A1 Jun. 22, 2006

(51) Int. Cl.
*G06F 7/00* (2006.01)
(52) U.S. Cl. ........ 707/713; 707/731; 707/758; 709/217; 709/219
(58) Field of Classification Search ........................ None
See application file for complete search history.

(56) References Cited

U.S. PATENT DOCUMENTS

| | | | |
|---|---|---|---|
| 6,006,222 A | 12/1999 | Culliss | |
| 6,014,665 A | 1/2000 | Culliss | |
| 6,078,916 A | 6/2000 | Culliss | |
| 6,182,068 B1 | 1/2001 | Culliss | |
| 6,285,999 B1 | 9/2001 | Page | |
| 6,314,420 B1 | 11/2001 | Lang et al. | |
| 6,526,440 B1 * | 2/2003 | Bharat | 707/3 |
| 6,539,377 B1 | 3/2003 | Culliss | |
| 6,725,259 B1 | 4/2004 | Bharat | |
| 6,732,088 B1 * | 5/2004 | Glance | 707/3 |
| 2003/0014399 A1 * | 1/2003 | Hansen et al. | 707/3 |

OTHER PUBLICATIONS

Fagin, R. et al., "Searching the Workplace Web," *Proceedings of the Twelfth International Conference on World Wide Web*, ACM Press, pp. 366-375 (2003).
Cho, J. and R. Sourashis, "Impact of search engines on page popularity," *Proceedings of the 13th International Conference on the World Wide Web*, ACM Press, pp. 20-29 (2004).
Brin, S. and L. Page, "The anatomy of a large-scale hypertextual web search engine," *Computer Networks and ISDN Systems 30(1-7)*:107-117, Apr. 1998.
Hansen, M. and E. Shriver, "Using navigation data to improve IR functions in the context of Web search," *Proceedings of International Conference on Information and Knowledge Management '01*, Nov. 5-10, 2001, ACM Press, pp. 135-142 (2001).
Sleator, D.D. and R.E. Tarjan, "Amortized Efficiency of List Update and Paging Rules," *Communications of the ACM 28(2)*:202-208 (1985).

\* cited by examiner

*Primary Examiner* — Fred I Ehichioya
*Assistant Examiner* — Hasanul Mobin (57) ABSTRACT

Computer method and apparatus for collaborative web search operate in an intranet with non-existent or defective link structure. A search engine produces an initial search result list in response to a user query. A list optimizer reranks pages on the initial list based on implicit user recommendation or endorsement of pages. A last click heuristic defines user endorsement of a page. To form the final result list, the list optimizer scores each page according to reranking, a textual match (or information retrieval score) of the page with the query and an adjustment value.

3 Claims, 6 Drawing Sheets

COMPUTER METHOD AND APPARATUS FOR COLLABORATIVE WEB SEARCHES

BACKGROUND OF THE INVENTION

Internet searches can be conceptually viewed as comprising two components: one is indexing the web pages and their contents, and the second is ranking (ordering) the pages according to relevance to a given query. Ranking is usually based on a combination of a grade for the textual match (or information retrieval score) between the query and the page, and a grade for page "importance." Page importance is typically calculated by the structure of the web pages on a web site (roughly speaking, a page pointed to by many other pages is considered important).

The disadvantages in algorithms that are based on analyzing the link structure in the web is that they are not applicable in situations where the link structure is non-existent (i.e., search plain text as opposed to searching hyper-text), as is the case when searching books or other documents without links or when searching a company's internal web (a corporate intranet search). Experience also shows that the link structure in corporate intranets is not good for such link analysis. Another problem with the link-analysis approach is that it is typically slow to respond to dynamic changes, because updating web documents to reflect changes in preferences (including the appearance of good new pages) is a cumbersome and slow process.

In the case of searching a company's internal web (or intranet searches in general), successful Internet search engines (such as Google) provide less than satisfactory results. Thus there is a need for improved intranet searching.

SUMMARY OF THE INVENTION

The present invention addresses the foregoing problems in intranet searches (i.e., corporate web searches) and more generally in processing searches where the link structure is nonexistent or defective.

In a preferred embodiment, computer method and apparatus for collaborative web search operate in an intranet even with non-existent or defective link structure. A search engine produces an initial search result list in response to a user query. A list optimizer reranks pages on the initial list based on implicit user recommendation or endorsement of pages. A last click heuristic defines user endorsement of a page. To form the final result list, the list optimizer may score each page according to reranking, a textual match (or information retrieval score) of the page with the query and an adjustment value.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Applicants contend several reasons for current dismal results in intranet (a company's internal web) searches. As alluded to above, modern Internet search engines like Google work by analyzing the structure of the hypertext links pointing from one page to another, but the Internet's link structure is quite different from a corporate intranet's. In Google's page ranking algorithm, a page is important if many pages point to it, and a page is very important if many important pages point to it, and so on. In a sense, the most important pages are the ones at the "center" of the web, and tend to form a strongly connected component of pages pointing to each other (Brin, S. and L. Page, "The Anatomy of a Large-Scale Hypertextual Web Search Engine, *Computer Networks and ISDN Systems* 30(1-7):107-117, 1998).

On the other hand, intranets like corporate webs do not have this structure that Google depends on. First, a relatively small number of people are assigned the job of building large portions of the web, documenting products and policies and procedures, all of which is branded and reviewed periodically after publication. Second, many corporate web pages simply have no outgoing links, such as pages generated from special purpose databases. Most important, corporations tend to provide little motivation to design extremely popular pages, in contrast to the Internet where seeing your page at the top of Google results can generate personal, social and financial rewards. How many company employees write a page describing a project, and then take time to go out and beg others in the company to link from their pages to this project page?

Another reason for such dismal intranet search results is the nature of the queries themselves. Intranet queries tend to be relatively focused and tend to have only a few "right" answers. A person issuing the query "vacation" inside a company is probably interested only in how to take and report taking vacation, probably documented by a page or two on the corporate web site. In contrast, outside the company, the query "vacation" would probably be satisfied by any number of pages describing interesting vacation spots or deals on vacations. It can be much harder to find the single right answer to an intranet query than it is to find a handful of the best answers on the Internet.

Applicants think user feedback is the missing element in intranet searches. Applicants' approach is to use an existing search engine to crawl, index and rank the pages on the intranet web, but to use user feedback to rerank the pages returned by the search engine before presenting them to the user. FIGS. 1-3A and B are illustrative.

The present invention aims to give a good ranking of the pages even if the link structure is defective or non-existent, and it can quickly adapt to dynamic changes in the preferences of users. The present invention provides a computer method and apparatus for use with intranet search engines, and with search engines over a non-hypertext corpus.

Figure 1:
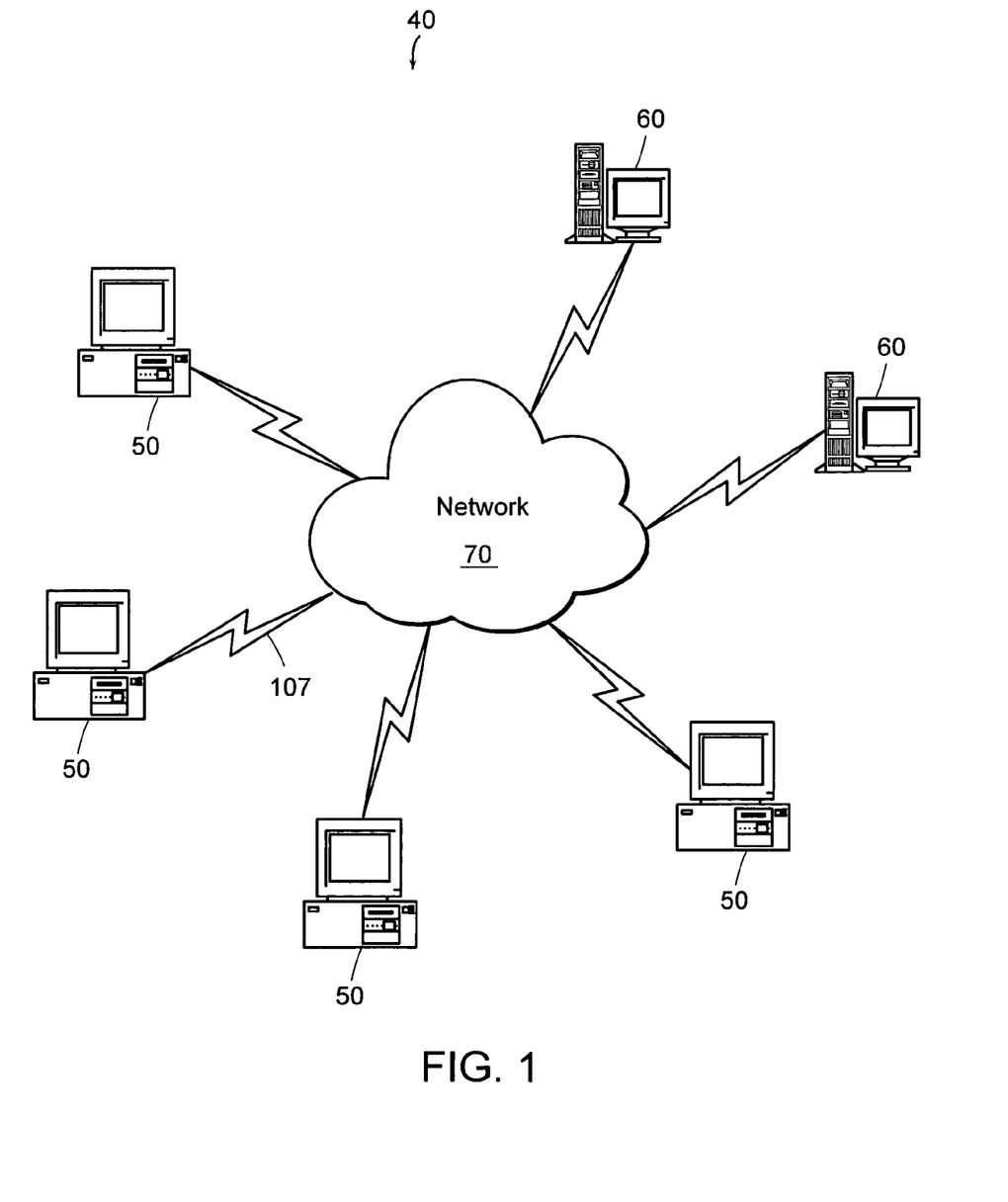
FIG. 1 is a schematic view of a computer environment in which embodiments of the present invention may be practiced.

FIG. 1 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 2:
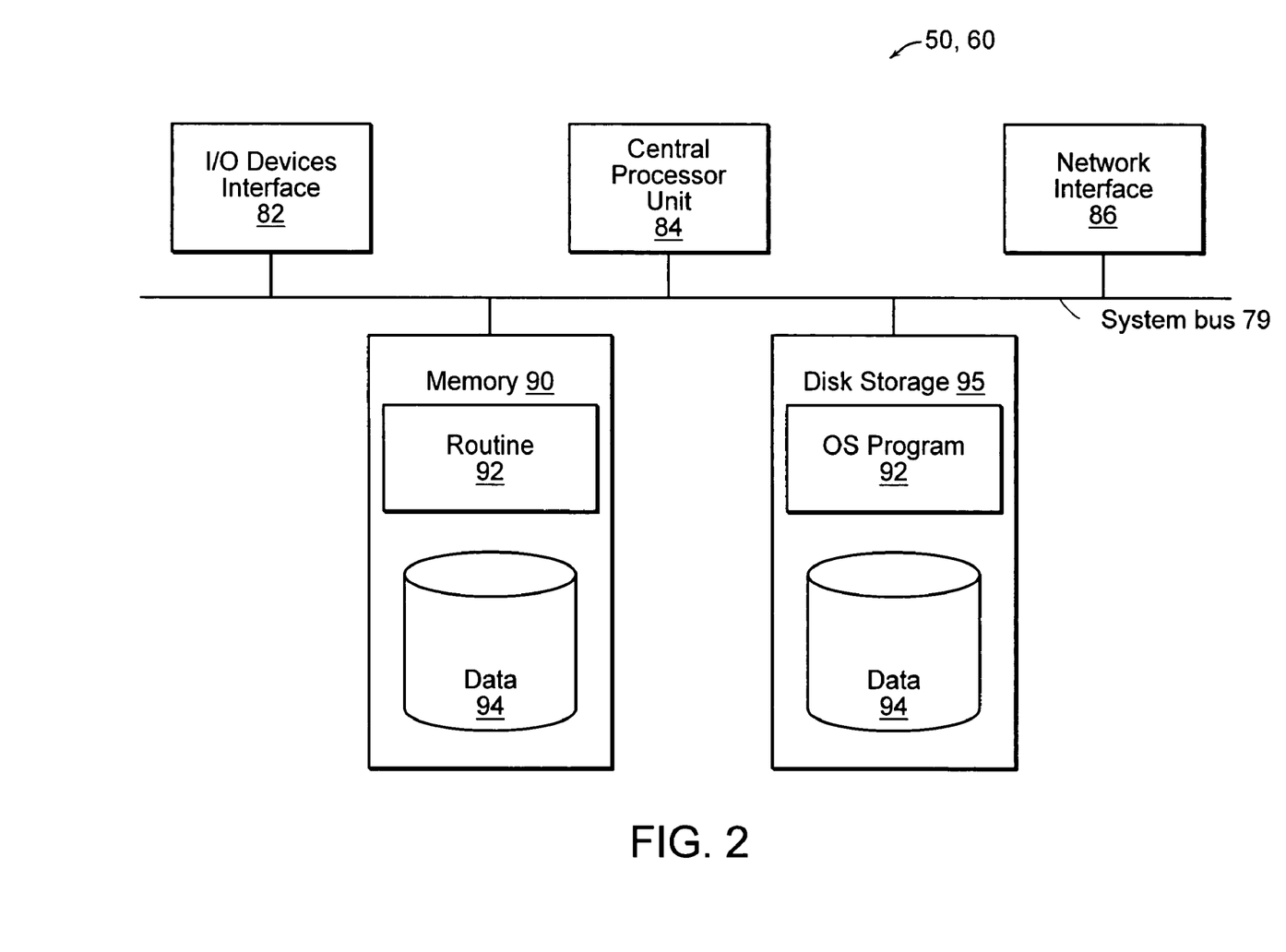
FIG. 2 is a block diagram detailing a computer node from FIG. 1.

FIG. 2 is a diagram of the internal structure of a computer (e.g., client processor/device 50 or server computers 60) in the computer system of FIG. 1. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 1). Memory 90 provides volatile storage for computer software instructions used to implement an embodiment of the present invention (e.g., Program Routines 92 and Data 94, detailed later). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals/medium, storage medium and the like.

In the instant example, network 70 and clients/servers 50, 60 and the data therein form a corporate (company) internal web or intranet 40.

Figure 3A:
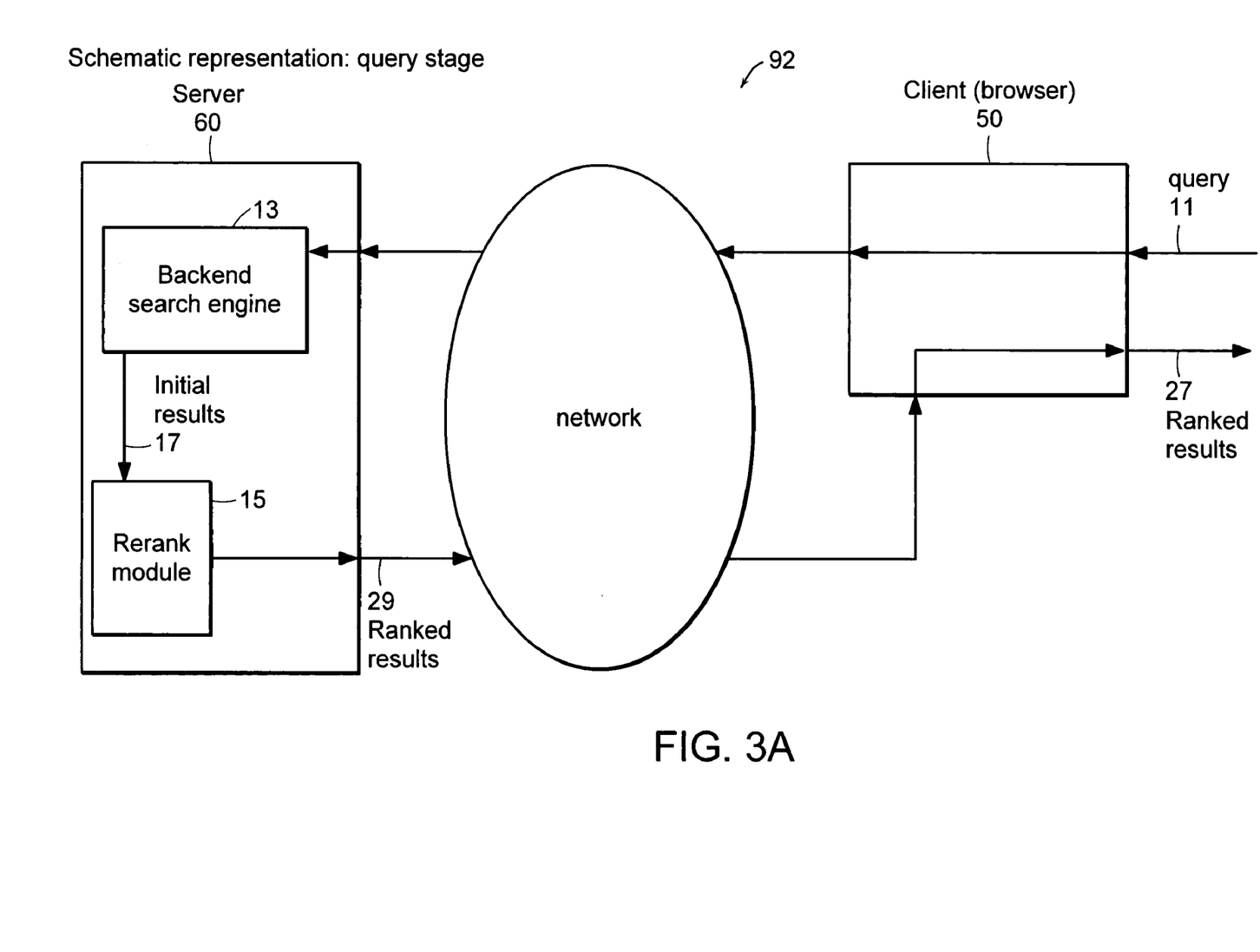
FIGS. 3A-3C are block and flow diagrams of a preferred embodiment of the present invention.
Figure 3B:
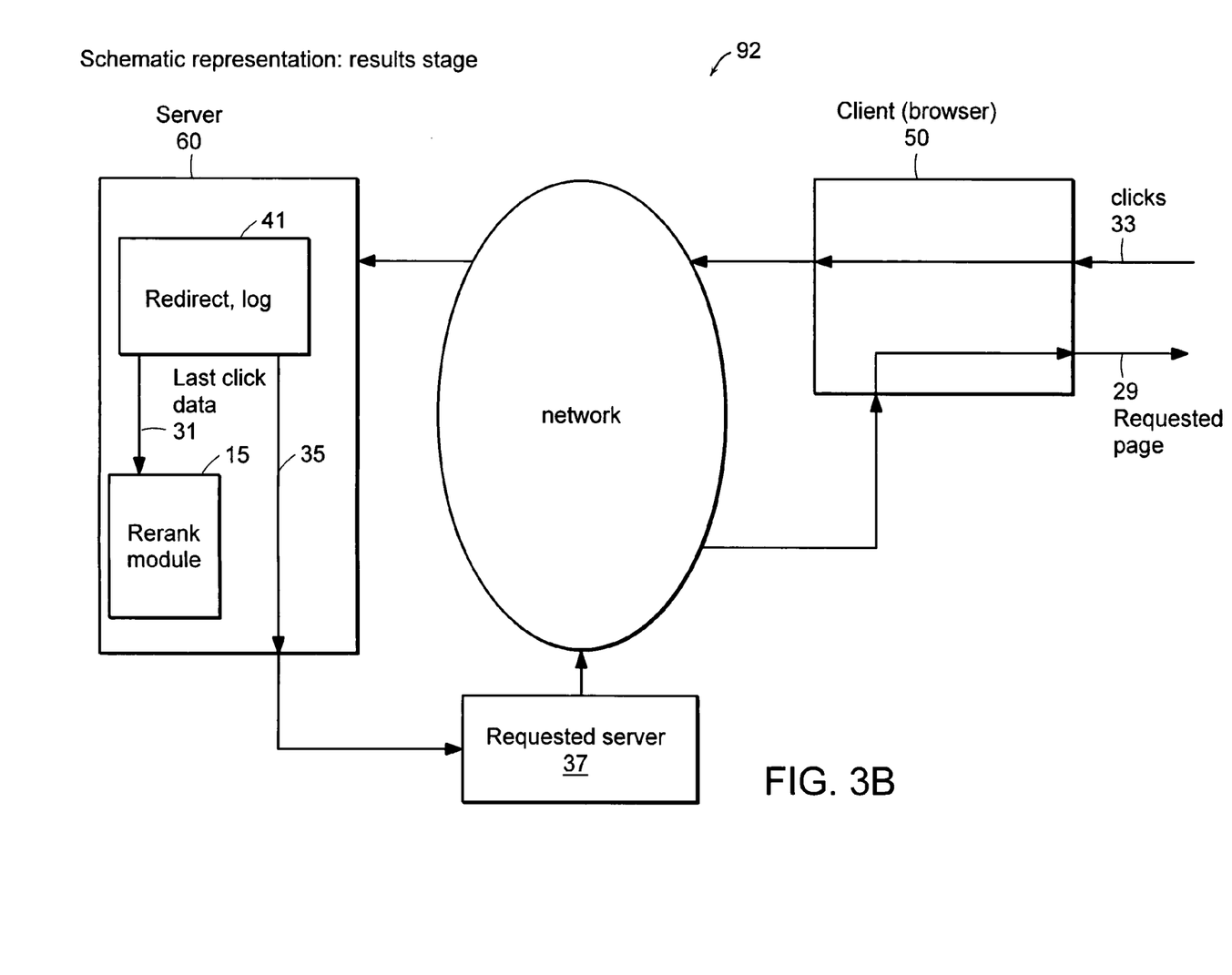

As illustrated in FIGS. 3A and 3B, a preferred embodiment 92 of the present invention employs a search engine 13, a user endorsement subsystem 31, 41 and a result list optimizer (also referred to herein as reranking engine/module) 15. The search engine 13 has a user interface through which the user inputs or otherwise specifies a query 11 of the subject intranet (or company internal web). Search engine 13 is responsive to the input query 11 and generates an initial search result list 17. The search engine 13 is, for example, Google, AltaVista or the like.

List optimizer/reranking engine 15 is coupled to receive a list of pages (e.g., the initial search result list 17) from search engine 13 and a list of query-endorsement pairs from the endorsement subsystem 31, 41. A main purpose of list optimizer (reranking engine) 15 is to reorder the initial result list 17 based on information of users collected by the present invention that are treated as implicit recommendations of users. In particular, a page last clicked on by a user is considered to be implicitly recommended or endorsed by the user as further discussed below.

In the preferred embodiment, the invention system 92 collects endorsements in two steps: first it logs every link the user clicks 33 (using a standard redirection trick) and second it scans this log 41 periodically to determine the endorsed (last clicked) pages 31. Other methods of collecting endorsements are suitable. With reference to FIG. 3B, the results 17 output by the search engine 13 are not direct links to their target, but rather "redirect" links 35 that allow the server 60 to log the clicks 33 made by the user. These redirect links 35 are also tagged by "session ID," that allow the server 60 to distinguish between different queries 11. Session ID is assigned by search engine 13. The server 60 tracks each session, in the sense that it records (e.g., in a log 41 (FIG. 4) stored at 94) each choice (click) 31 made by a user along with the time. If sufficient time has elapsed (say 20 minutes), it is assumed that the session has ended, and, therefore, that the last result clicked 31 was the best result. The present invention approach considers the session to endorse the last page clicked 31. This is used to update the ranking as made clear and further described next with reference to the internal operations of list optimizer/reranking engine 15 illustrated in FIGS. 3B and 3C.

Figure 3C:
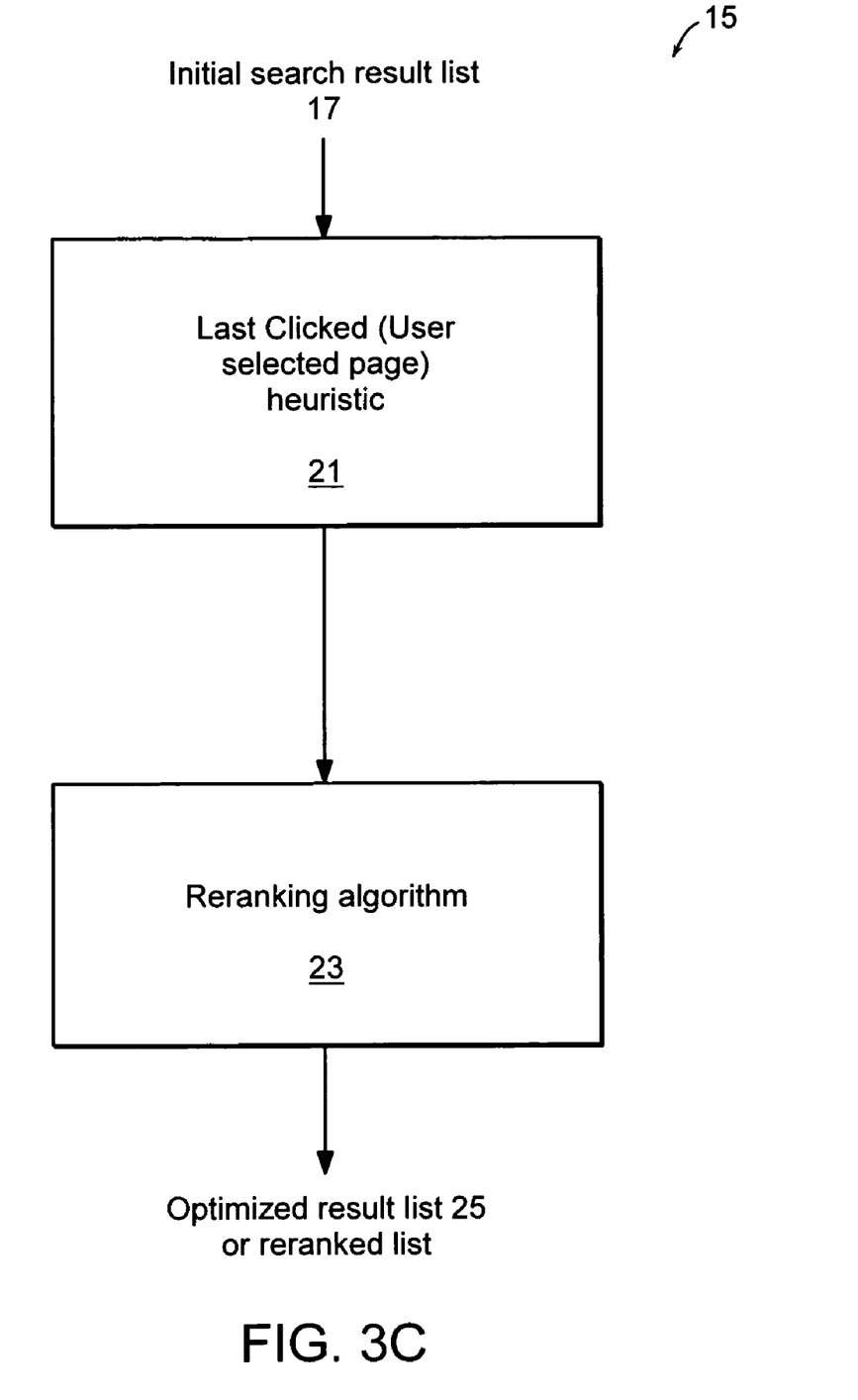

When a user issues a query 11 (FIG. 3A), search engine 13 responds with a ranked list 17 of pages (presenting perhaps just ten at a time) and the user browses these pages one after another. That is, a user selects (clicks on) 33 one of the pages listed on the displayed part of the initial results list 17, and the corresponding redirect link 35 (FIG. 3B) of the selected page generates a request to the corresponding server 37. The corresponding server 37 produces the requested (selected) page 29 which is displayed to the user through the client browser 50. The user may further examine the requested page 29 or return to the result list 17 to select another page. The order in which the user examines these pages may be quite strange, but eventually the user stops at or returns to the page that gives the best answer to the query 11. The present invention reranking engine 15 passively monitors the user's behavior and identifies this best answer using the following "last clicked" heuristic 21 (FIG. 3C):

A user U endorses a page P as the best answer to a query Q if P is the last page U clicks on in a search session for Q.

Figure 4:
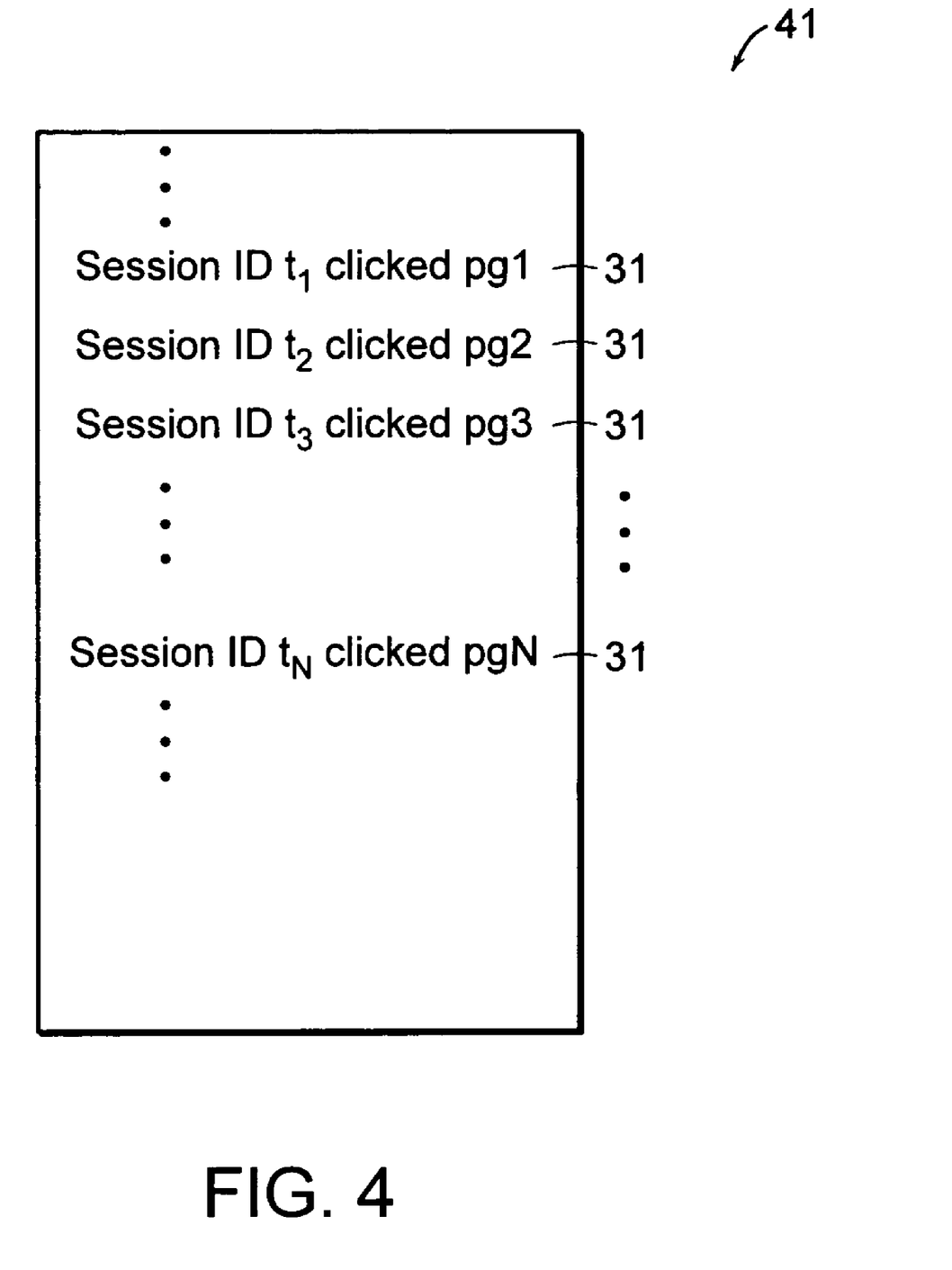
FIG. 4 is a schematic view of log data supporting the list optimizer of FIGS. 3A and 3B.

The present invention 92 instruments the initial ranked list 17 of pages presented to the user, to log the session id and the pages 29 clicked on (or otherwise selected by the user) during the session, and periodically scans the log 41 to compute for each query 11 which pages the users have endorsed. FIG. 4 illustrates one embodiment of log 41.

Once server 60 has collected endorsements with the "last clicked" heuristic 21, present invention reranking engine 15 reranks or reorders 23 (FIG. 3C) the pages on initial search results 17 for a given query 11 as follows. Reranking engine 15 utilizes the query-endorsement pairs information (from 21) to generate local and global statistics. In the global statistics, the number of times a page is endorsed (clicked on or otherwise selected) by a user for any query 11 is counted/tracked. In the local statistics, for each query 11, reranking engine 15 keeps track of (counts) the number of times a page is endorsed (clicked on or otherwise selected) by a user for that query.

Next, reranking engine 15 uses the generated local or global statistics to reorder the subject list of pages 17 by one of the following methods (algorithms):

1. Statistical: Count the number of times a page 29 has been endorsed for the query 11, and display the pages in order of decreasing count, so the page that gets the most endorsements is displayed first (in 25, FIG. 3C) and so on.

2. Move-to-Front: Maintain an ordered list of pages 29 for the query 11, and each time a page is endorsed, move it to the head of the list 25.

3. Probabilistic: Generate the list 25 by a stochastic process, where the probability of a page being the next page in the list 25 is proportional to the number of endorsements the page 29 has received.

The Statistical ordering is the most stable method. It is the most resistant to noise, including attacks by malicious users, and some users like the fact that the ordering remains fairly consistent The Move-to-Front ordering is the most dynamic. It adapts quickly to change in that once a good result is discovered, the corresponding page 29 will move immediately to the front, and following users will endorse that page 29 as a good result and keep it 29 at the front. The Move-to-Front ordering also enjoys the theoretical advantage of being nearly optimal when users are searching for different results: the total number of pages the users must examine to find pages they want is at most twice the best possible. This method is also resistant to attacks by malicious users in that even if all but 20% of the users are malicious, the best result remains in the top five positions.

The probabilistic ordering enjoys the virtues of both the Statistical and Move-to-Front algorithms and has several nice theoretical properties as discussed in Awerbuch, B. et al., "Collaboration of Untrusting Peers with Changing Interests", in *Proc. ACM Conf on Electronic Commerce*, pp. 112-119 (2004), and Awerbuch, B. et al., "Improved Recommendation Systems," in *Proc. ACM-SIAM Symp. on Discrete Algorithms* to appear 2005.

Any combination of the generated statistics (local or global) and application of one of the foregoing methods (algorithms) is suitable.

For example, in one embodiment, the reranking process at 23 (FIG. 3C) first chooses one of the Statistical method, Move-to-Front algorithm or probabilistic methods above. Next, process 23 takes the list 17 of pages from the search engine 13 for this query 11 and divides it into three working sections: a local section, a global section and remainder section. For the local section, process 23 takes the pages that have been endorsed by users for this query 11 and orders them using the above selected algorithm/method with local statistics. For the global section, process 23 takes the pages that have been endorsed by users for some query, but not for this particular query 11 and orders them using the selected algorithm/method with global statistics. For the remainder section, the process 23 takes the pages that have never been endorsed by any user for any query (that is, takes the remaining pages of 17) and orders them in the same way the search engine 13 did (which was probably using information retrieval scores).

The reranked list 25 is then formed by taking the pages (or subset) of the resulting local section, followed (appended) by the pages (or subset thereof) of the resulting global section, followed by the pages of the resulting remainder section.

Other combinations of applying the Statistical, Move-to-Front and Probabilistic ranking methods are suitable for forming optimized or reranked result list 25.

To generate the final displayed list (output 27, FIG. 3A), a grade is computed for each page using a combination of the following scores:

A $score_1$ of the page's textual match (or information retrieval score) with the query (e.g., rank in initial result list 17)

The page's rank in the reordered list 25 ($score_2$)

An adjustment value ($score_3$), generated for each session anew.

The adjustment value element is used to allow new pages to be eyeballed by a few users, so that good new pages will quickly get to the top of the list 25. In one embodiment, the adjustment value is a randomly selected value in the range of 0-50. Other values and methods for defining the adjustment value are suitable.

The combination of scores may be a simple addition of $score_1+score_2+score_3$ or a weighted summing. The page with the highest combined score is output at the top of the final displayed list (at 27, FIG. 3A), followed by the page with the second highest combined score, and so forth.

While this invention has been particularly shown and described with references to preferred embodiments thereof, it will be understood by those skilled in the art that various changes in form and details may be made therein without departing from the scope of the invention encompassed by the appended claims.

For example, there is an alternative to the use of redirect links 35. If the search engine 13 can read the access logs for the web server 37, then redirection is not necessary. This is the case when the search engine 13 and web server 37 run on the same machine.

What is claimed is:

1. A computer apparatus for collaborative web search, comprising:

a processor, a search engine, executed by the processor, the search engine producing an initial search result list in response to a query by a user of the search engine, and a list optimizer coupled to the search engine to receive the initial search result list and rerank pages on the list based on implicit endorsements of pages by the user of the search engine, the list optimizer forming and outputting a final result list from at least the reranked pages, wherein the list optimizer employs a last clicked heuristic to define endorsement of a page by the user, wherein the list optimizer is to further utilize pages endorsed by at least one of the user of the search engine and another user of the search engine in queries to the search engine in reranking the pages, the queries to the search engine being different from the first query by the user of the search engine.

2. A method for collaborative web search, comprising the steps of:

in response to a query by a user of a search engine, employing the search engine to produce an initial result list;

reranking pages on the initial search result list based on implicit endorsement of pages in the produced initial result list by the user, wherein the reranking utilizes pages endorsed by at least one of the user of the search engine and another user of the search engine in queries to the search engine, the queries being different from the query by the user of the search engine; and forming and outputting to the user a final result list for the query, the final result list including at least the reranked pages, wherein the step of reranking includes employing a last clicked heuristic to define the endorsement of a page of the pages by the user.

3. A computer program product embodied on one or more non-transitory computer readable storage mediums, the computer program product comprising instructions for:

receiving a search result list produced by a search engine connected to a network in response to a query by a user of the search engine;

responsive to the received search result list and responsive to input from the user on the received search result, reranking pages on the list, wherein the reranking utilizes pages endorsed by at least one of the user of the search engine and another user of the search engine in queries to the search engine, the queries being different from the query by the user of the search engine;

forming and outputting a final result list according to at least the reranking of pages, wherein the reranking of pages includes employing a last clicked heuristic to define endorsement of a page, the last clicked heuristic being generated based on the input from the user on the received search result.

* * * * *